United States Patent [19]

Foolen

[11] 4,306,741
[45] Dec. 22, 1981

[54] ROTATABLE SWIVEL FOR ONE OR MORE CONDUITS

[75] Inventor: Jan A. Foolen, Eze-sur-Mer, France

[73] Assignee: Single Buoy Moorings Inc., Fribourg, Switzerland

[21] Appl. No.: 105,522

[22] Filed: Dec. 20, 1979

[30] Foreign Application Priority Data

Dec. 22, 1978 [NL] Netherlands ................... 7812505

[51] Int. Cl.³ ............................................. F16L 39/04
[52] U.S. Cl. ........................................ 285/136; 285/190
[58] Field of Search ...................... 285/136, 190, 276

[56] References Cited

U.S. PATENT DOCUMENTS

| | | | |
|---|---|---|---|
| 2,293,585 | 8/1942 | Bard | 285/136 |
| 3,237,220 | 3/1966 | Brandt | 285/190 X |
| 3,462,176 | 8/1969 | Goodrum | 285/136 |
| 3,466,061 | 9/1969 | Fonda-Bonardi | 285/276 X |
| 3,698,433 | 10/1972 | Dobler et al. | 285/136 X |
| 3,966,249 | 6/1976 | Lindquist | 285/136 X |
| 4,052,090 | 10/1977 | Stafford | 285/136 X |
| 4,065,159 | 12/1977 | Leroy et al. | 285/136 |
| 4,111,467 | 9/1978 | de Fremery | 285/136 |
| 4,126,336 | 11/1978 | Ortloff et al. | 285/190 X |

Primary Examiner—Thomas F. Callaghan
Attorney, Agent, or Firm—Young & Thompson

[57] ABSTRACT

The invention relates to a swivel for one or more conduits comprising inner wall portions (3) and outer wall portions (2) for each annular chamber which wall portions (2, 3) are rotatably supported upon each other by means of a single axial-radial bearing the inner race way rings (7) and outer race way rings (10) of which are attached to the axial end faces of the inner (3) and outer wall portions (2) of said chamber.

2 Claims, 3 Drawing Figures

ROTATABLE SWIVEL FOR ONE OR MORE CONDUITS

The invention relates to a rotatable swivel for one or more conduits comprising one or more annular chambers each of which includes a stationary wall portion and a wall portion rotatably mounted with respect thereto, said wall portions being supported on each other by means of radially and axially operative bearings and being sealed with respect to each other, while each wall portion possesses a single- or multi-line connection. A similar rotatable swivel is known for instance from Dutch Patent Application No. 7310795 laid open for public inspection.

In this known swivel the wall portions are supported on each other by means of two bearings spaced apart in axial direction, which bearings are combined with seals arranged on either side thereof. In case of rotatable swivels of mooring buoys the swivels are often of large dimensions. Consequently this means that each chamber is provided with two expensive bearings. Due to these bearings and the location of the seals the entire design is complicated and therefore expensive as regards maintenance or repair.

The object of the invention is to provide improvements in this regard.

In accordance with the invention this object is attained in that each rotatable wall portion is supported on a stationary wall portion by means of a single axial-radial bearing.

Hence the invention is based on the recognition that a single axial-radial bearing suffices, which is contrary to the traditional views.

It is preferred that the bearing have a diameter considerably larger than the axial length of the chamber. Consequently more favourable bearing loads will occur in operation.

Preferably the axial-radial bearing is a roller-bearing having separate rollers for the axial load and the radial load, respectively, for instance a bearing of the Rote-Erde-type.

According to the invention it is preferred that the bearing be positioned axially next to the corresponding chamber, said bearing having its outerring attached to an outer wall portion and its inner ring attached to an inner wall portion. Hence each chamber will have the bearing axially next to the chamber. This means a further simplification of the design, because the chamber wall portions may be made matching by means of simple seals, which seals at the side of the bearing will keep the bearing outside thereof free from the medium present in the chamber.

In the case of two axially successive chambers the bearing is present between the chambers while the outer wall portions and/or inner wall portions of said chambers are fixedly joined together. Although each chamber may be provided with its own axial-radial bearing, it is also possible in accordance with this modification to support both the chambers by means of a single intermediate bearing.

Preferably the inner wall portions are coupled to each other via an interposed ring coupling the inner wall portions by means of cooperating lugs and recesses in the circumferential direction.

The invention will now be elucidated in further detail with reference to the drawings.

Figure 1:
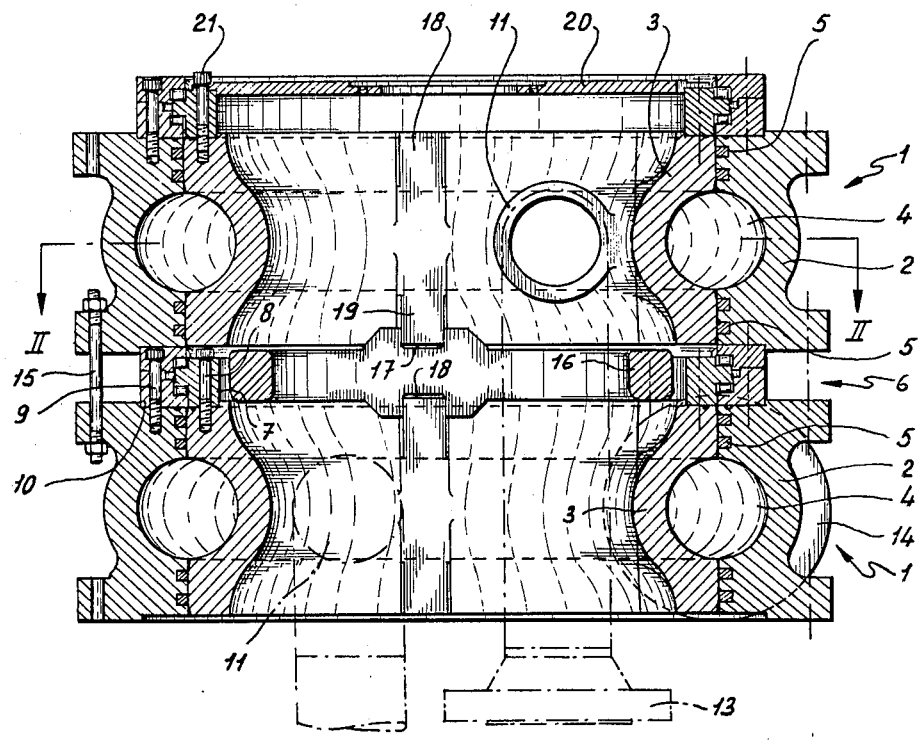
FIG. 1 shows a longitudinal section along the line I—I in FIG. 2.
Figure 2:
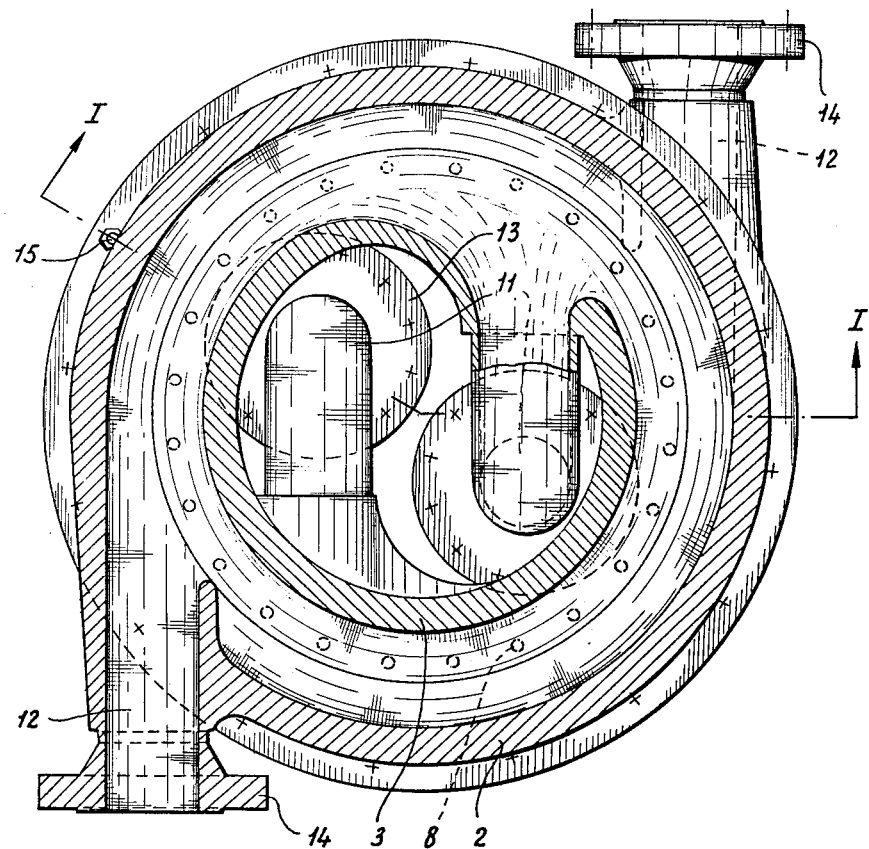
FIG. 2 shows a horizontal section through one chamber along the line II—II in FIG. 1.
Figure 3:
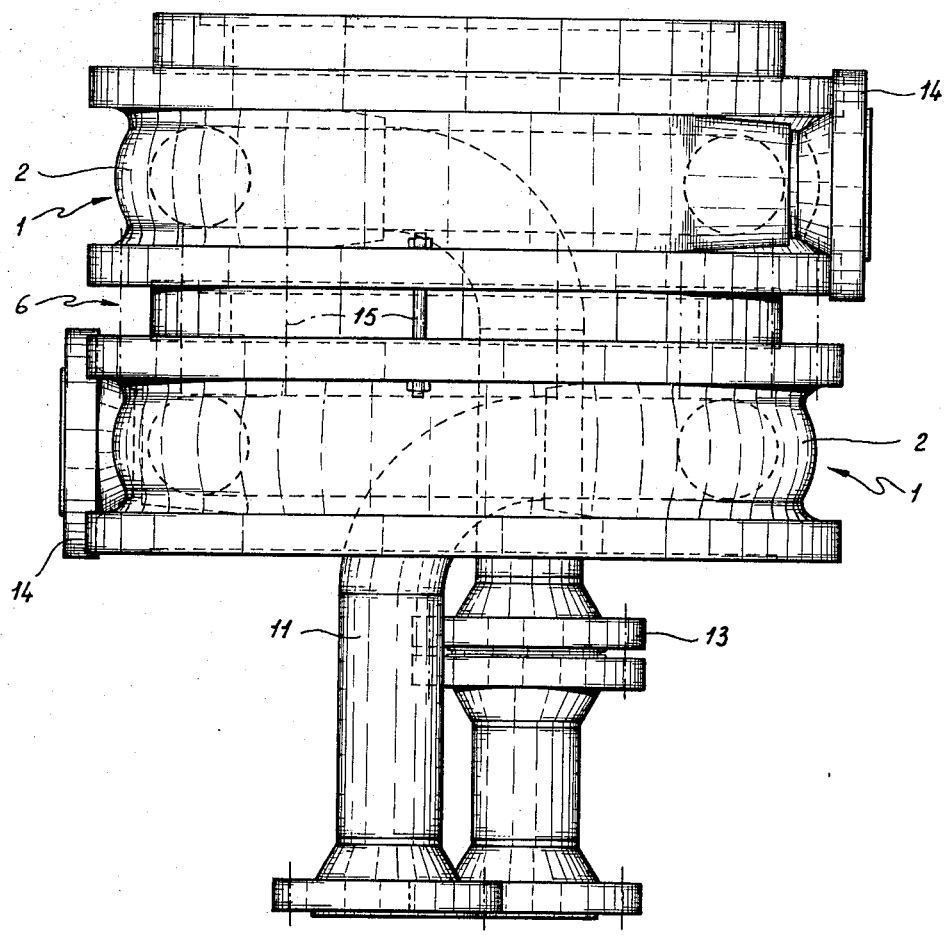
FIG. 3 represents a side elevation.

The drawings show a rotatable swivel including two chambers. Each chamber 1 consists of an outer ring 2 and an inner ring 3 together constituting an essentially annular channel 4. Between the outer ring 2 and the inner ring 3 are seals 5 which seals in the represented embodiment are accommodated in grooves within the inner wall of the outer ring 2. To each one of the chambers there is fastened an axial-radial bearing 6, the inner raceway 7 of which is fastened to the inner ring 3 by means of bolts 8 and the outer raceway 10 of which is fastened to the outer ring 2 by means of bolts 9. In the drawing there is shown a roller bearing having axially operative rollers and radially operative rollers, for example a roller bearing of the Rote-Erde-type.

Each channel 4 has an inlet part 11 and an outlet part 12 each of which has been provided with a flange 13 and 14, respectively for connection to (not shown) conduits.

The outer rings 2 of the chambers placed on top of each other are connected to each other by means of bolts 15. Between the inner rings 3 and at the same level as the bearing there is an annular coupling means 16 having with recesses 17, 18 which may be engaged by lugs 19 of the inner ring 3. The inner rings 3 may consequently be coupled to each other in the circumferential direction. This coupling is a loosely fixed joint not requiring a mutual aligning when utilizing several units including bearings. Furthermore this joint is disengaged upon moving apart of the chambers.

Although only two chambers have been shown in the drawings it will be clear that more than two chambers may be joined together in the indicated manner.

Likewise it is conceivable that there will be only a single chamber optionally being subdivided and suitable for providing several inlet and outlet line connections. Several chambers of the latter type may of course be joined together. Stated otherwise each chamber 1 may have more than one channel 4.

From the embodiment shown in the drawings it will be clear that the disengagement of the conduit at the flange 14 is possible without any difficulty. Upon removal of the bolts 15 and the disengagement of the flange 13 the upper chamber 1 may be removed in an upward direction.

I claim:

1. In a rotatable swivel for conduits comprising inner and outer annular wall portions defining between them a plurality of coaxial annular chambers, said inner and outer wall portions being rotatable relative to each other, and connections to said annular chambers; the improvement in which all said outer wall portions are identical, all said inner wall portions are identical, there being a said inner and outer wall portion individual to each said chamber, and the inner and outer wall portions of each annular chamber are rotatably supported upon each other by means of an axial-radial bearing individual to each said chamber, each said bearing having an inner race ring secured to one end face of the inner wall portion and having outer race rings secured to the corresponding end face of the outer wall portion, and means holding said outer wall portions together.

2. A rotatable swivel as claimed in claim 1 wherein adjacent outer wall portions are interconnected by means of bolts and adjacent inner wall portions are held against rotation relative to each other by means of a ring located at the level of said bearing inside the inner race ring of said bearing, said interconnecting ring interconnecting said adjacent inner wall portions by means of lugs and recesses.

* * * * *